United States Patent
Mattes et al.

(10) Patent No.: US 6,625,564 B2
(45) Date of Patent: Sep. 23, 2003

(54) DEVICE FOR RECOGNIZING AN OVERTURN PROCESS OF A VEHICLE

(75) Inventors: Bernhard Mattes, Sachsenheim (DE); Juergen Kissner, Schwieberdingen (DE); Walter Wottreng, Takasaki (JP); Hans-Peter Lang, Ludwigsburg (DE); Kosmas Knoedler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,916

(22) PCT Filed: Apr. 5, 2001

(86) PCT No.: PCT/DE01/01319

§ 371 (c)(1), (2), (4) Date: Apr. 11, 2002

(87) PCT Pub. No.: WO01/79035

PCT Pub. Date: Oct. 25, 2001

(65) Prior Publication Data

US 2002/0169577 A1 Nov. 14, 2002

(51) Int. Cl.$^7$ .............................. G06F 15/00; G06F 7/00
(52) U.S. Cl. ...................... 702/150; 702/145; 702/151; 701/45; 701/48
(58) Field of Search ................................. 702/141, 142, 702/145, 147, 150, 151–153; 701/29, 45, 46, 47–48; 340/436, 438, 440; 180/274, 282; 280/734, 735

(56) References Cited

U.S. PATENT DOCUMENTS

| | | | |
|---|---|---|---|
| 5,610,575 A | | 3/1997 | Gioutsos |
| 6,038,495 A | | 3/2000 | Schiffmann |
| 6,424,897 B1 | * | 7/2002 | Mattes et al. .................. 701/45 |
| 6,496,759 B1 | * | 12/2002 | Mattes et al. .................. 701/1 |

* cited by examiner

*Primary Examiner*—Bryan Bui
(74) *Attorney, Agent, or Firm*—Kenyon & Kenyon

(57) ABSTRACT

The arrangement is to allow timely rollover recognition in the event of tipping over an embankment. For this purpose, the arrangement determines a predictive value of the yaw rate of the vehicle after a fictitious impact of the wheels on one longitudinal side of the vehicle against the ground from a yaw rate prevailing prior to the fictitious impact, the momentum of the vehicle in the direction of its vertical axis, and the angular momentum of the center of gravity of the vehicle prior to the fictitious impact. In addition, using the currently measured angle of inclination of the vehicle, it determines a critical yaw rate of the vehicle about its longitudinal axis instantaneously measured by the arrangement, which would be required to cause the vehicle to roll over. A conclusion is drawn about an imminent rollover if the predictive value of the yaw rate exceeds the critical yaw rate.

2 Claims, 2 Drawing Sheets

DEVICE FOR RECOGNIZING AN OVERTURN PROCESS OF A VEHICLE

FIELD OF THE INVENTION

The present invention relates to an arrangement for recognizing an imminent rollover of a vehicle which determines a critical yaw rate of the vehicle about its longitudinal axis, which would be required to cause the vehicle to roll over, as a function of the angle of inclination of the vehicle about its longitudinal axis.

BACKGROUND INFORMATION

According to German Published Patent Application No. 197 44 083, the critical yaw rate corresponds to a rotation energy of the vehicle, which just exceeds the potential energy of the vehicle. Namely, if this is the case, i.e., the critical yaw rate is attained, the vehicle will certainly roll over. This allows early prediction of a vehicle rollover, so that the safety devices fitted in the vehicle (e.g., airbags, roll bars, etc.) can be deployed in a timely manner prior to the actual rollover. With the aforementioned criterion which determines a critical yaw rate, an imminent rollover can be recognized with a high degree of reliability during driving maneuvers, in which the center of gravity of the vehicle is raised by a certain height in the earth's gravity field, for example, when driving through a ramp, while the vehicle is in contact with the ground. When driving through a ramp in this manner, the energy of the vehicle is converted from rotation energy into potential energy. Driving on an embankment, when the car travels over an embankment and tips over as a result, represents another driving maneuver. Contrary to traveling through a ramp, in the case of driving over an embankment potential energy is converted into rotation energy; namely, the vehicle tips down the embankment without any external influencing factor (except for the force of gravity). It can be seen that the aforementioned criterion, known from German Published Patent Application No. 197 44 083, according to which a critical yaw rate is determined in order to recognize an imminent rollover, is not suitable for tipping over on an embankment, since it makes a premature rollover decision. Another criterion, described in German Published Patent Application No. 197 44 083, which can be referred to as angular criterion, is also not suitable for timely recognition of a rollover. This angular criterion is based on the fact that yaw rate signals delivered by a yaw rate sensor are filtered and integrated over a certain period of time. The resulting mean angle corresponds, with good approximation, to the actual current angle of inclination of the vehicle which is compared to a vehicle-specific critical angle starting at which the situation of the vehicle becomes unstable. The angular criterion has the disadvantage that it makes the decision of whether or not the vehicle will roll over relatively late, namely only when the vehicle-specific critical angle of inclination has been attained.

SUMMARY OF THE INVENTION

An object of the present invention is therefore to provide an arrangement of the aforementioned type which recognizes an imminent rollover in the event of a driving maneuver such as tipping over an embankment in a timely manner, i.e., neither too early nor too late.

The aforementioned object is achieved by the fact that in the event the arrangement detects a motion behavior of the vehicle that is characteristic for tipping over an embankment, it determines a predictive value of the yaw rate of the vehicle after a fictitious impact of the wheels on one longitudinal side of the vehicle against the ground from a yaw rate prevailing prior to the fictitious impact, the momentum of the vehicle in the direction of its vertical axis, and the angular momentum about the center of gravity of the vehicle prior to the fictitious impact, and it signals an imminent rollover if the predictive value of the yaw rate exceeds a critical yaw rate.

In the special case of traveling down over an embankment, where the potential energy of the vehicle is converted into rotation energy, the application of a balance of momentums according to the present invention for determining a predictive value of the yaw rate of the vehicle after tipping over the edge of an embankment results in timely recognition of a situation leading to a rollover.

DETAILED DESCRIPTION

Figure 1:
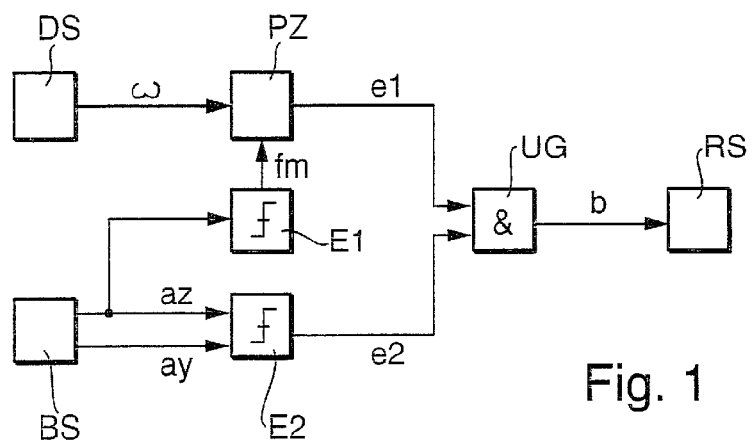
FIG. 1 shows a block diagram of an arrangement for recognizing an imminent rollover of a vehicle.

The arrangement for recognizing an imminent rollover of a vehicle, illustrated in FIG. 1, has one or more yaw rate sensors DS, which measure at least the yaw rate $\omega$ about an axis in the longitudinal direction of the vehicle. The at least one measured yaw rate $\omega$ is supplied to a processor PZ, which produces a rollover decision e1. A decision circuit E1 determines, from the prevailing motion behavior of the vehicle, which it derives, at least from the vehicle acceleration az in the direction of its vertical axis, whether an embankment tipover type driving maneuver is taking place.

If the processor obtains information fm about driving over an embankment, it determines, using a criterion to be described in detail below, whether the vehicle will roll over. If so, it issues a rollover decision e1.

In order to enhance the reliability of the rollover decision produced by processor PZ, rollover decision e1 of processor PZ can be subjected to a plausibility check. A decision element E2 is provided for this purpose, which compares acceleration az measured in the direction of vertical axis z of the vehicle and acceleration ay measured in the direction of transverse axis y of the vehicle with predefined threshold values. If these threshold values are exceeded, decision element E2 also produces a rollover decision e2, which, like rollover decision e1, is supplied by processor PZ to an AND gate UG. Only if both rollover decisions e1, e2 signal an imminent rollover, does AND gate UG produce a final rollover decision b, which causes restraint systems RS (e.g., airbags, roll bars, etc.) to deploy. However, the plausibility check can also be omitted, in which case rollover decision e1 of processor PZ directly results in the deployment of restraint systems RS.

Figure 2:
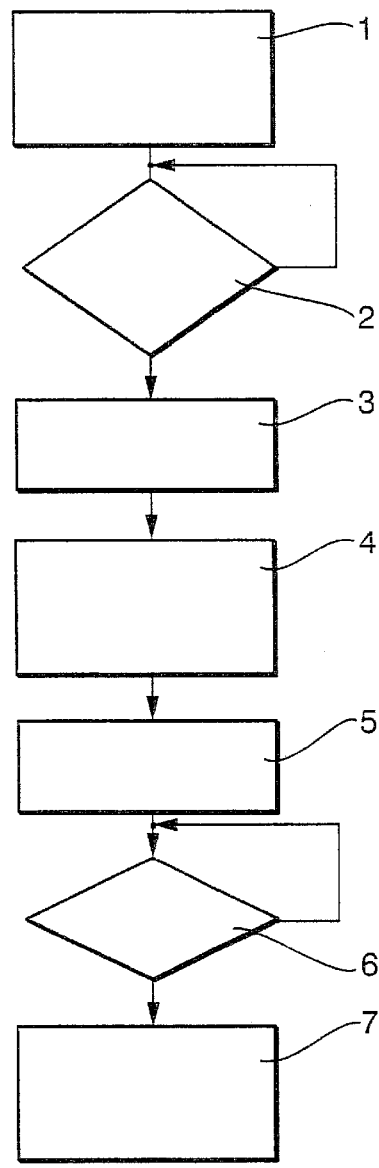
FIG. 2 shows a flow chart for making rollover decisions.

FIG. 2 shows a flow chart with reference to which the derivation of a rollover decision e1, produced in processor PZ, is explained below.

Figure 3:
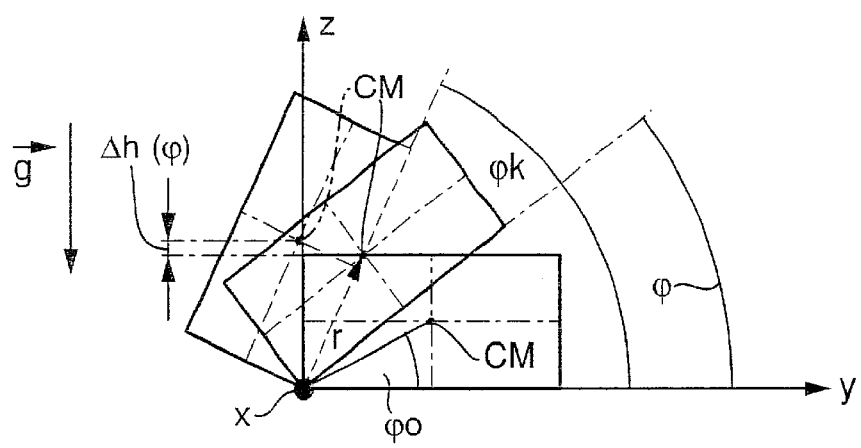
FIG. 3 shows a geometric representation to illustrate the energy criterion.

In a method step 1, a critical yaw rate $\omega k$ is determined according to an energy criterion. The geometric representation in FIG. 3 shows how this critical yaw rate $\omega k$ occurs.

The vehicle with its center of gravity CM is shown as a simple rectangle. The z axis of the coordinate system shown points in the direction of the vertical axis, the y axis points in the direction of the transverse axis, and the x axis in the direction of the longitudinal axis of the vehicle. Two different angles of inclination $\phi$ and $\phi k$ of the vehicle with respect to the x axis, which in this case runs along the vehicle's wheels, for example, are shown. Angle $\phi 0$ describes the position of center of gravity CM with respect to transverse axis y of the vehicle. The coordinate system is oriented so that its z axis is parallel to the earth's acceleration vector g.

Critical yaw rate $\omega k$ to be determined is the yaw rate that would be required, with an instantaneous angle of inclination $\phi$, for the vehicle to roll over. This critical yaw rate $\omega k$ is computed by equating the potential energy of the vehicle, which is required for lifting center of gravity CM of the vehicle by a height $\Delta h$ in the gravity field of the earth, and the rotational energy of the vehicle with respect to the axis of rotation x. If the vehicle is lifted by a certain height $\Delta h$ critical angle $\phi k$ is attained. This occurs when center of gravity CM of the vehicle is located vertically above transverse axis y. A rollover decision is made as soon as the yaw rate delivered by yaw rate sensor DS and filtered is greater than critical yaw rate $\omega k$ computed for the instantaneous angle of inclination $\phi$. Critical yaw rate $\omega k$ is therefore determined as follows according to the energy criterion:

$$\Delta Epot = Erot \quad (1)$$

$$m \cdot g \cdot \Delta h(\varphi) = \frac{1}{2} I \cdot \omega k^2(\varphi) \quad (2)$$

$$\omega k(\varphi) = \pm \sqrt{\frac{2mg}{I} \Delta h(\varphi)} \quad (3)$$

In formulas (1) through (3), m denotes the mass of the vehicle, g the earth's acceleration, and I the moment of inertia of the vehicle. The height difference $\Delta h((\phi))$ is determined according to equation (4):

$$\Delta h(\phi) = r(1 - \sin(\phi + 0)) \quad (4)$$

In equation (4), r denotes the distance between center of gravity CM and the bearing point of the vehicle in the x axis.

Equation (3) shows that the absolute value of critical yaw rate $\omega k$ decreases with the increase of angle $\phi$. When critical angle $\phi k$ is reached, no additional yaw rate is necessary to cause the vehicle to roll over.

In method step 2 a query is performed as to whether the behavior of the vehicle indicates tipping over an embankment. If this special driving maneuver is taking place, this is communicated by decision element E1 to processor PZ via signal fm, as explained in connection with FIG. 1.

Figure 4:
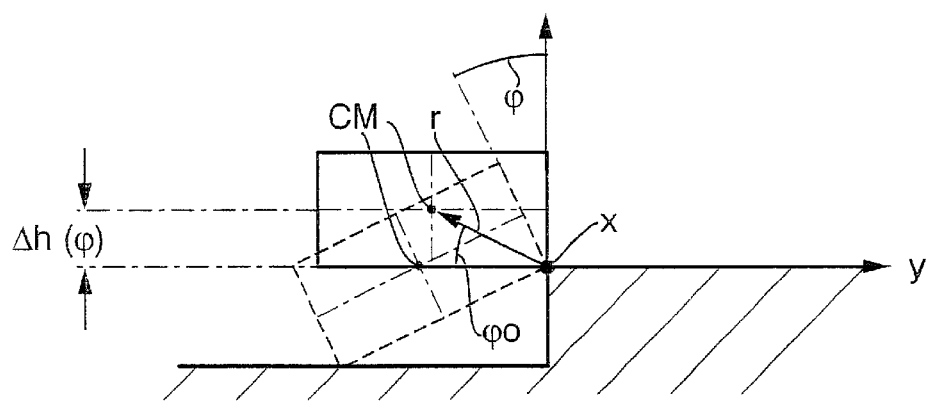
FIG. 4 shows a geometric representation to illustrate tipover on an embankment.

With reference to FIG. 4, we shall initially explain what is meant by the term tipping over an embankment. Tipping over an embankment is a special driving maneuver in which both wheels of one longitudinal side of the vehicle are in the air until they impact again on the ground below. In the coordinate system shown in FIG. 4, the x axis is parallel to the axis of travel direction of the vehicle and represents the axis of rotation about which the vehicle rotates over the embankment when tipping over.

Figure 5:
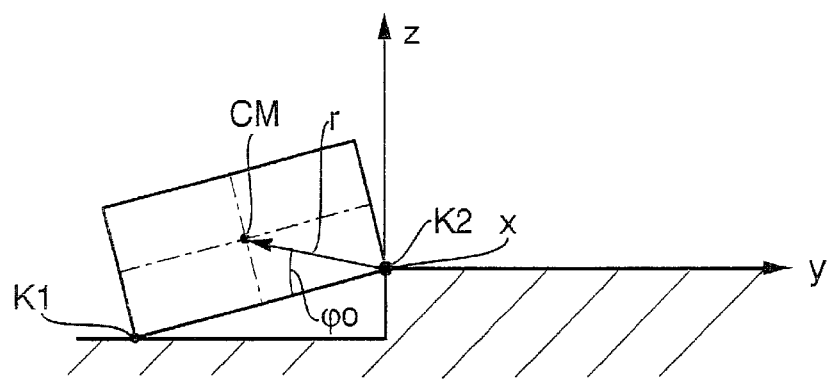
FIG. 5 shows a geometric representation to illustrate the momentum criterion.

Since, as explained previously, the described energy criterion alone is not suitable for making a decision about an imminent rollover when the vehicle tips over an embankment because the rollover decision is made prematurely prior to a possible rollover, the momentum criterion to be described in more detail below is used here. The momentum criterion is elucidated in the following with reference to the geometric sketch shown in FIG. 5. The basic idea of the momentum criterion is the development of a physical model which allows a rollover decision not to be made during tipping over an embankment until greater angles of inclination of the vehicle are reached. For this purpose, the future behavior of the vehicle is examined as it was for the energy criterion.

In the case of tipping over an embankment, a relationship is established between yaw rate $\omega v$ of the vehicle before and yaw rate $\omega n$ after a fictitious impact of the side of the vehicle that is in the air. In order to derive the desired relationship between yaw rates $\omega v$ and $\omega n$ before and after the impact of edge K1 of the vehicle which was previously in the air, an elastic impact is assumed when describing the impact of edge K1 against the ground. Thus, the vehicle rotates after the impact about edge K1. Edge K2 of the embankment itself is assumed to no longer be present at the time of the impact. The conservation laws for the center of gravity momentum and for the angular momentum with respect to center of gravity CM are used. The vehicle continues to be considered as a rigid body.

As can be seen from the flow chart of FIG. 2, after driving over an embankment is recognized in step 3 via yaw rate sensor DS (see FIG. 1), yaw rate $\omega v$ while the vehicle tips over the edge of the embankment, i.e., before a possible rollover to still follow, and rotation angle $\phi$ of the vehicle with respect to longitudinal axis x are measured. The following relationship exists between yaw rate $\omega v$ before and a yaw rate $\omega n$ after a fictitious impact of the vehicle after it has tipped over the edge of the embankment:

$$\omega n = f(\phi) \omega v \quad (5)$$

Yaw rate $\omega v$ is a predictive value from which ultimately a decision for an imminent rollover can be derived.

In method step 3, function $f(\phi)$ is determined from a balance of momentums for center of gravity CM of the vehicle in the direction of the z axis and an angular momentum balance about center of gravity CM as follows:

For the z component of the momentum relative to center of gravity CM before and after the impact, the following equation applies:

$$Pn = Pv + \Delta P \rightarrow m \cdot vzn = m \cdot vzv + \Delta P, \quad (6)$$

where Pv is the momentum before, Pn the momentum after, vzv the z component of the vehicle speed before and vzn the z component of the vehicle speed after an impact, and m is the vehicle mass.

For the angular momentum before and after an impact of the vehicle, the following formula applies:

$$I \cdot \omega n = I \cdot \omega v - r \cdot \cos(\phi + \phi 0) \cdot \Delta P \quad (7)$$

The motion of the vehicle prior to an impact can be described using equation (8):

$$vzv = \omega v \cdot (-r) \cdot \cos(\phi - \phi 0) \quad (8)$$

During an impact at point K1 (see FIG. 5), the elastic impact of the vehicle can be described as follows:

$$0 = vn + \omega n \cdot (-r) \cdot \cos(\phi - \phi 0) \quad (9)$$

Function $f(\phi)$ is now obtained from equations (6) through (9):

$$f(\varphi) = \frac{1 - \frac{mr^2}{I}\cos(\varphi + \varphi 0)\cdot\cos(\varphi - \varphi 0)}{1 + \frac{mr^2}{I}\cos^2(\varphi + \varphi 0)} \quad (10)$$

In method step 4, a predictive value for a critical yaw rate ωnc after an impact is determined according to equation (11) from critical yaw rate ωk determined in step 1 according to the energy criterion and function f(ϕ)

$$\omega nc = \frac{\omega k}{f(\varphi)} \quad (11)$$

If this value ωnc is attained or exceeded by yaw rate ωn calculated by step 5 according to the momentum criterion from equation (5)—this threshold value decision takes place in step 6 processor PZ issues a rollover decision e1 in step 7.

What is claimed is:

1. An arrangement for recognizing an imminent rollover of a vehicle, comprising:

an arrangement for determining a critical yaw rate of the vehicle about a longitudinal axis thereof that would be required to cause the vehicle to roll over, the critical yaw rate being determined as a function of an angle of inclination of the vehicle about the longitudinal axis;

an arrangement that, in the event a motion behavior of the vehicle that is characteristic for tipping over an embankment is detected, determines a predictive value of a second yaw rate of the vehicle after a fictitious impact of wheels of the vehicle located on one longitudinal side of the vehicle against the ground from a third yaw rate prevailing prior to the fictitious impact, a momentum of the vehicle in a direction of a vertical axis thereof, and an angular momentum of a center of gravity of the vehicle prior to the fictitious impact; and an arrangement for signaling the imminent rollover if the predictive value of the second yaw rate exceeds the critical yaw rate.

2. The arrangement according to claim 1, wherein:

the predictive value of the yaw rate of the vehicle is computed by multiplying the third yaw rate of the vehicle prior to the fictitious impact by a factor $$f(\varphi) = \frac{1 - \frac{mr^2}{I}\cos(\varphi + \varphi 0)\cdot\cos(\varphi - \varphi 0)}{1 + \frac{mr^2}{I}\cos^2(\varphi + \varphi 0)},$$

where I is a moment of inertia of the vehicle, m is a mass of the vehicle, r is a distance of the center of gravity of the vehicle to the wheels on one longitudinal side, ϕ is the angle of inclination of the vehicle with respect to the longitudinal axis, and ϕ0 is an angular position of the center of gravity of the vehicle relative to a transverse axis of the vehicle, and the critical yaw rate is calculated according to $$\omega nc = \frac{\omega k}{f(\varphi)},$$

where the following equation applies:

$$\omega k = \pm\sqrt{\frac{2mg}{I}r(1 - \sin(\varphi + \varphi 0))}.$$

* * * * *